US007280451B2

(12) United States Patent
Ono

(10) Patent No.: US 7,280,451 B2
(45) Date of Patent: Oct. 9, 2007

(54) WOBBLE SIGNAL DETECTING CIRCUIT FOR OPTICAL DISK DEVICE AND WOBBLE SIGNAL DETECTING METHOD

(75) Inventor: Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 549 days.

(21) Appl. No.: 10/899,127

(22) Filed: Jul. 27, 2004

(65) Prior Publication Data

US 2005/0025009 A1 Feb. 3, 2005

(30) Foreign Application Priority Data

Jul. 29, 2003 (JP) .......................... P.2003-281518

(51) Int. Cl.
*G11B 7/00* (2006.01)

(52) U.S. Cl. .................................................... 369/47.27

(58) Field of Classification Search ............... 369/47.1, 369/47.27, 275.3, 47.28, 44.13
See application file for complete search history.

(56) References Cited

U.S. PATENT DOCUMENTS 5,495,465 A * 2/1996 Arisaka ................... 369/47.48
6,262,955 B1 * 7/2001 Kim ........................ 369/44.41
6,920,096 B2 * 7/2005 Tateishi ................... 369/47.48
6,987,719 B2 * 1/2006 Mashimo ................. 369/53.34
2003/0123358 A1 7/2003 Kanda et al. ............ 369/53.22

FOREIGN PATENT DOCUMENTS

JP 2000-207745 7/2000
JP 2001-118243 4/2001
JP 2003-78392 3/2003
JP 2003-242641 8/2003

* cited by examiner

*Primary Examiner*—Nabil Hindi
(74) *Attorney, Agent, or Firm*—Morgan, Lewis & Bockius LLP

(57) ABSTRACT

A wobble signal detecting circuit for an optical disk reproducing device configured to reproduce an optical disk which has a track including a snaking portion at a specific period, including an optical detecting unit which detects a signal written on the track, first and second band-pass filters which have different pass bandwidths and extract respectively a first and second wobble frequency components of the snaking portion based on outputs from the optical detecting unit, and a wobble signal determining unit determines that a wobble signal is present if a frequency difference or a frequency ratio of the first and second wobble frequency components is equal to or less than a prescribed value. Preferably, a higher frequency side shoulder of a bandwidth of the first band-pass filter and a lower frequency side shoulder of a bandwidth of the second band-pass filter are located on a wobble frequency.

11 Claims, 10 Drawing Sheets

(SPECTRUM OF ENTIRE MEASURED SIGNAL)

(SPECTRUM OF BPF)

(SPECTRUM OF HPF)

(SPECTRUM OF SIGNAL AFTER PASSED THROUGH BPF)

(SPECTRUM OF SIGNAL AFTER PASSED THROUGH HPF)

(SPECTRUM OF ENTIRE MEASURED SIGNAL)

(SPECTRUM OF LPF)

(SPECTRUM OF HPF)

(SPECTRUM OF SIGNAL AFTER PASSED THROUGH LPF)

(SPECTRUM OF SIGNAL AFTER PASSED THROUGH HPF)

100
101
A
B
C
D
FIRST ADDER
102
SECOND ADDER
103
(B + C)
(A + D)
SUBTRACTER
104
(A + D) - (B + C)
BPF
105
BINARY-DIGITIZING CIRCUIT
106
FREQUENCY DETECTING CIRCUIT
107
SYSTEM CONTROLLER
108

(SPECTRUM OF ENTIRE MEASURED SIGNAL)

(SPECTRUM OF BPF)

(SPECTRUM OF SIGNAL AFTER PASSED THROUGH BPF)

WOBBLE SIGNAL DETECTING CIRCUIT FOR OPTICAL DISK DEVICE AND WOBBLE SIGNAL DETECTING METHOD

BACKGROUND OF THE INVENTION

1. Field of the Invention

This invention relates to a wobble signal detecting circuit for an optical disk reproducing device for an optical disk with a track including a portion snaking at a specific period.

2. Description of the Related Art

Recent DVDs (Digital Versatile Disc) include a reproduction-only media and recordable media. For the reproduction-only media, there is a copy control technology adopted in the DVD standard of CPPM (Content Protection for Prerecorded Media).

According to this standard, the optical disk such as DVD includes a wobble that is a guide track groove snaking at a prescribed amplitude and period over the entire disk. In reproducing DVD-AUDIO, whether or not there is the wobble is determined. If there is no wobble, reproduction must not be performed. In reproducing DVD-AUDIO, therefore, the wobble signal must be detected.

Various detecting circuits have been proposed for detecting the wobble signal (see e.g. JP-A-2001-118243).

FIG. 8 shows a general configuration of a conventional wobble signal detecting circuit.

A wobble signal detecting circuit 100 detects the wobble signal using the outputs from an optical detector 101 provided on an optical pick-up. Specifically, the optical detector 101 has a first portion A, a second portion B, a third portion C and a fourth portion D which are four square parts into which the entire area of the optical detector 101 is divided. In this case, it should be noted that the extending direction of a dividing line of the first portion A and second portion B accords with the tangent direction of a guiding track not shown.

The first portion A and fourth portion D are connected to a first adder 102, whereas the second portion B and third portion C are connected to a second adder 103. Further, the output from the first adder 102 and the output from the second adder 103 are connected to a subtracter 104. The output from the subtracter 104 is connected to a band-pass filter (BPF). The band-pass filter 105 is provided to remove the noise component other than the wobble frequency. The pass bandwidth of the band-pass filter 105, therefore, is set so that its central frequency is approximately equal to the wobble frequency. The output from the band-pass filter 105 is connected to a frequency detecting circuit 107 through a binary-digitizing circuit 106. The output from the frequency detecting circuit 107 is supplied, as a wobble detecting signal (wobble frequency component), to a system controller 108.

More specifically, on the basis of the signals (A+D) and (B+C) supplied to the subtracter 104, a push-pull signal (A+D)−(B+C) is created. The noise component of this push-pull signal is removed by the band-pass filter 105. The frequency component of the wobble signal is extracted by the binary-digitizing circuit 106 and the frequency detecting circuit 107.

FIG. 9 shows the manner of extracting the wobble signal by the band-pass filter 105. FIG. 9A is a spectrum diagram of the entire measured signal including a wobble signal S11. FIG. 9B is a spectrum diagram showing the pass bandwidth of the band-pass filter 105. The center frequency thereof is set to be approximately equal to the frequency of the wobble signal (in this embodiment, 150 kHz). FIG. 9C is a spectrum diagram of the signal after having passed through the band-pass filter 105, which shows the status when the wobble signal has been extracted.

SUMMARY OF THE INVENTION

However, in the wobble signal detecting circuit 100, even where the wobble signal is present, the center frequency of the band-pass filter 105 is set in the vicinity of the frequency of a possible wobble signal. The subsequent stage, binary-digitizing circuit 106 may respond to the noise in the vicinity of the frequency. This presented a problem that when the frequency detecting circuit 107 detects the frequency of the responded portion, it will detect the frequency component approximately equal to when the wobble signal exists.

FIG. 10 shows the manner of the signal extracted by the band-pass filter 105 when the wobble signal is not present. FIG. 10A is a spectrum diagram of the entire measured signal including no wobble signal. FIG. 10B is a spectrum diagram showing the pass bandwidth of the band-pass filter 105. FIG. 10C is a spectrum diagram of the signal after having passed through the band-pass filter 105. The band-pass filter 105 removes the noise at the other position other than the pass bandwidth. For this reason, only the noise at the center position of the band-pass filter 105 is conspicuous so that the spectrum looks as if there were the signal at the center position.

This invention has been accomplished in order to solve these problems. An object of this invention is to provide a wobble signal detecting circuit of an optical disk device which can surely detect the presence or absence of a wobble signal without being affected by noise.

In order to solve the above problem, the present invention may provide a wobble signal detecting circuit for an optical disk reproducing device configured to reproduce an optical disk which has a track including a snaking portion at a specific period including an optical detecting unit which detects a signal written on the track, a first band-pass filter and a second band-pass filter which have different pass bandwidths and extract respectively a first wobble frequency component of the snaking portion and a second wobble frequency component of the snaking portion based on outputs from the optical detecting unit, and a wobble signal determining unit which compares the first wobble frequency component and the second wobble frequency component to determine whether or not a wobble signal is present. Preferably, the wobble signal determining unit determines that a wobble signal is present if a frequency difference or a frequency ratio of the first wobble frequency component and the second wobble frequency component is equal to or less than a prescribed value, the first band-pass filter has a bandwidth a higher frequency side shoulder of which is located on a wobble frequency, and the second band-pass filter has a band width a lower frequency side shoulder of which is located on the wobble frequency.

In accordance with the above configuration, with respect to the frequency of e.g. 150 kHz of the wobble signal, where the first band-pass filter has the center frequency of 100 kHz and the pass bandwidth of 110 kHz, and the second band-pass filter has the center frequency of 200 kHz and the pass bandwidth of 110 kHz, if the wobble signal is present, through whichever band-pass filter, the frequency (frequency of about 150 kHz) in the vicinity of the wobble frequency will be measured. Namely, there is no substantial frequency difference measured after passed through both band-pass filters.

On the other hand, if the wobble signal is not present, the frequencies in the vicinity of the center frequencies of both band-pass filters are measured. Specifically, the frequency measured after passed through the first band-pass filter is about 100 kHz. The frequency measured after passed through the second band-pass filter is about 200 kHz.

Thus, by taking the frequency difference or frequency ratio between both band-pass filters, whether or not the wobble signal is present can be determined exactly.

In the embodiment described above, on the basis of the frequency of 145 kHz measured after passed through the first band-pass filter and frequency of 155 kHz of after passed through the second band-pass filter, if the wobble signal is present, the frequency difference is 10 kHz and the frequency ratio is about 1.07 (=155/145). On the other hand, if the wobble signal is not present, the frequency difference is 100 kHz and the frequency ratio is 2 (=200/100). In this way, the wobble signal determining unit, if the threshold value is set at e.g. 30 kHz for the frequency difference and at e.g. 1.2 for the frequency ratio, can surely detect the presence or absence of the wobble signal.

The present invention may also provide a wobble signal detecting-circuit for an optical-disk reproducing device configured to reproduce an optical disk which has a track including a snaking portion at a specific period including an optical detecting unit which detects a signal written on the track, two kinds of filter circuits which have different pass bandwidths and extracting wobble frequency components of the snaking portion based on outputs from the optical detecting unit, and a wobble signal determining unit which compares the wobble frequency components to determine whether or not a wobble signal is present.

The present invention may further provide a wobble signal detecting method configured to detect a wobble signal in an optical disk which has a track including a snaking portion at a specific period including detecting a signal written on the track, extracting two kinds of wobble frequency components of the snaking portion based on a detected output, and determining that a wobble signal is present if a frequency difference or a frequency ratio of the two kinds of wobble frequency components is equal to or less than a prescribed value.

In accordance with the wobble signal detecting circuit of an optical disk device of this invention, the presence or absence of a wobble signal can be determined without being affected by noise.

BRIEF DESCRIPTION OF THE DRAWINGS

Preferred embodiments of the present invention will be described in detail based on the following figures, wherein.

DETAILED DESCRIPTION OF THE INVENTION

Figure 1:
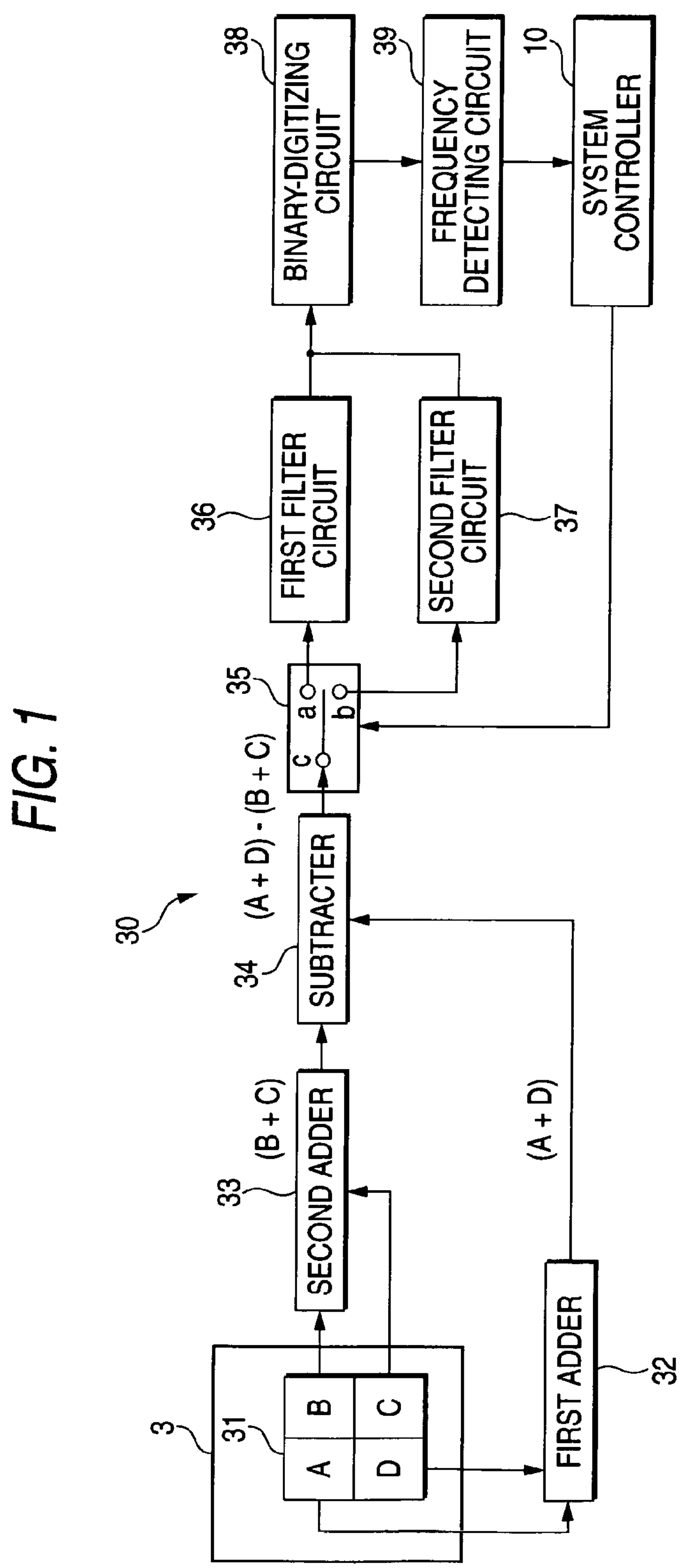
FIG. 1 is a block diagram showing an exemplary configuration of a wobble signal detecting circuit for a DVD device according to this invention.

Now referring to the drawings, an explanation will be given of various embodiments of this invention.

Figure 2:
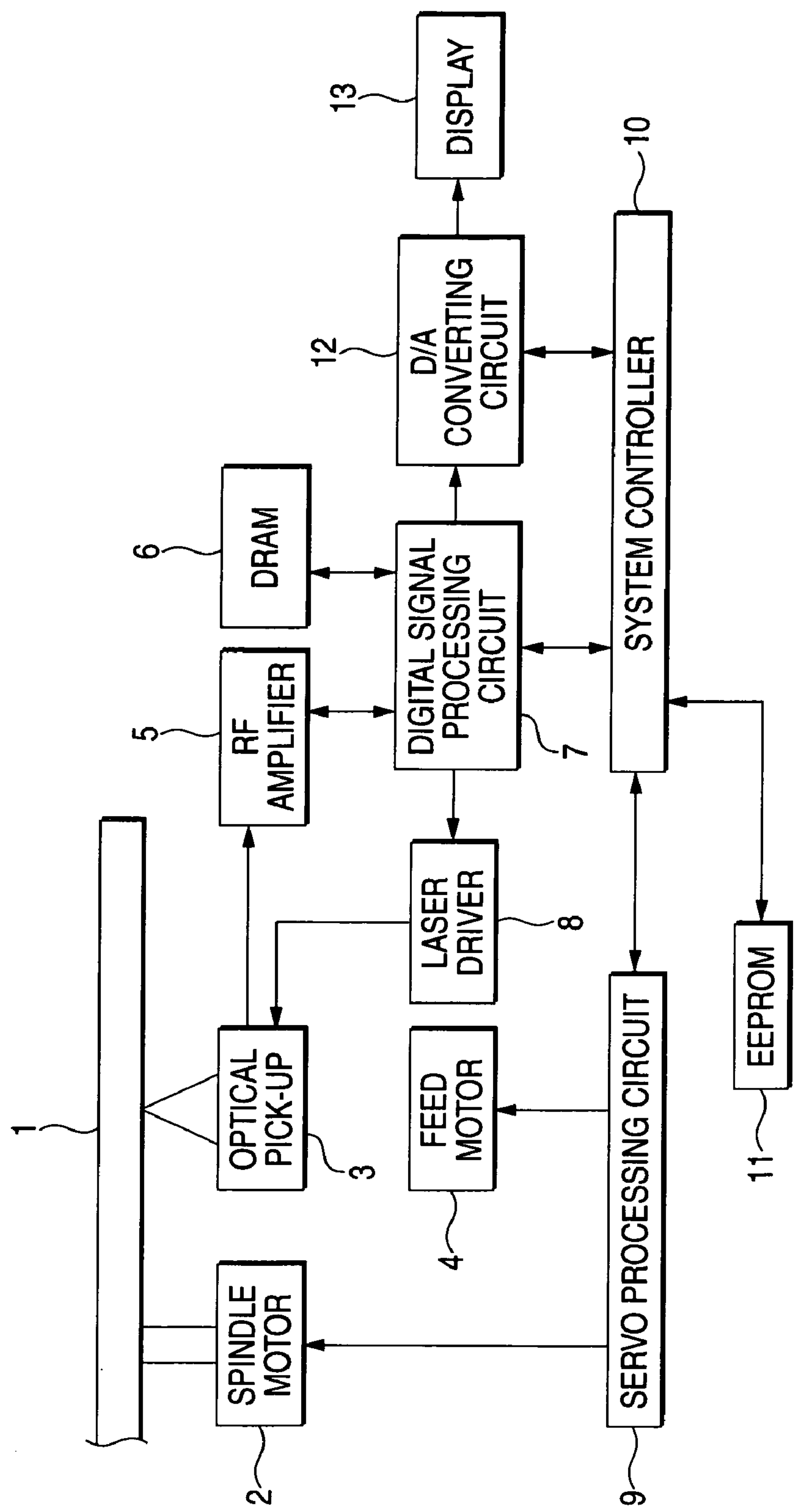
FIG. 2 is block diagram showing the basic configuration of a DVD device that is an optical device according to this invention.

FIG. 2 shows a basic configuration of a DVD device which is an optical disk device according to this invention. This DVD device may be a reproduction-only type or a recording/reproducing type. In this embodiment, a system configuration of recording/reproducing type is shown.

An optical pick-up 3 writes data in a loaded optical disk 1 and reads the data from the optical disk 1. The output from the optical pick-up 3 is connected to a digital signal processing circuit 7 through an RF amplifier 5. The output from the digital signal processing circuit 7 is connected to a laser driver 8 for controlling the laser output during the data write or data read by the optical pick-up 3. Further, the output from a servo processing circuit 9 is connected to a feed motor 4 and a spindle motor 2. The feed motor 4 serves to move the optical pick-up 3 in a radial direction of the optical disk 1. The spindle motor 2 rotatively drives the optical disk 1. The digital signal processing circuit 7 and servo processing circuit 9 are interactively connected to a system controller 10 for controlling the operation of the entire apparatus.

The digital signal processing circuit 7 is interactively connected to a DRAM 6 which serves as a buffer for temporarily storing data during a recording operation or reproducing operation. The digital signal processing circuit 7 is also connected to a D/A converting circuit 12 which converts digital data into analog data to be supplied to a display portion 13 such as CRT.

The system controller 10 is interactively connected to an EEPROM 11 for storing parameters of the optical disk 1 and laser power.

The digital signal processing circuit 7 performs the processing of delimiting a 16 bit signal with individual 8 bits and converting the 8 bits into 14 bits according to the error correcting system by EFM (eight-to-fourteen modulation) demodulation or ACIRC (Advanced Cross Interleaved Reed-Solomon Code). The digital signal processing circuit 7 also performs the processing of data compression for writing the digital data such as a video signal inputted from an external input terminal 16 into the optical disk 1.

The optical disk 1 includes a wobble formed on the entire surface, the wobble being a groove of a guiding track snaking at a prescribed amplitude and period.

FIG. 1 shows an exemplary configuration of a wobble signal detecting circuit in the DVD device.

A wobble signal detecting circuit 30 according to this embodiment detects a wobble signal using the outputs from an optical detector 31 provided on an optical pick-up 3. Specifically, the optical detector 31 has a first portion A, a second portion B, a third portion C and a fourth portion D which are four square parts into which the entire area of the optical detector 101 is divided. In this case, it should be noted that the extending direction of a dividing line of the first portion A and second portion B accords with the tangent direction of a guiding track not shown.

The first portion A and fourth portion D are connected to a first adder 32, whereas the second portion B and third portion C are connected to a second adder 33. Further, the output from the first adder 32 and the output from the second adder 33 are connected to a subtracter 34. The output from the subtracter 34 is connected to a common terminal c of a switching circuit 35.

The one terminal a of the switching circuit 35 is connected to a first filter circuit 36, whereas the other terminal b is connected to a second filter circuit 37. The respective outputs from the first filter circuit 36 and the second filter circuit 37 are connected to a frequency detecting circuit 39 through a binary-digitizing circuit 38. The output form the frequency detecting circuit 39 is supplied to the system controller 10. The system controller 10 performs the switching control for the switching circuit 35 in such a manner that it supplies a switching signal at suitable timings in determining the presence/absence of a wobble signal to switch the connection of the common terminal c between terminal a and terminal b, thus acquiring the wobble frequency component through the corresponding filter circuits 36 and 37.

More specifically, on the basis of the signals (A+D) and (B+C) supplied to the subtracter 104, a push-pull signal (A+D)−(B+C) is created. The noise component of this push-pull signal is removed by the first filter circuit 36 and second filter circuit 37, respectively, via the switching circuit 35. The frequency component of the wobble signal is extracted by the binary-digitizing circuit 38 and the frequency detecting circuit 39.

The system controller 10 compares two kinds of wobble signal frequency components obtained by the first filter circuit 36 and second filter circuit 37 to determine the presence/absence of the wobble signal. Concretely, the two kinds of wobble signal frequency components are compared. If the frequency ratio or frequency difference is not larger than a prescribed value, it is determined that the wobble signal is present.

With reference to concrete embodiments, an explanation will be given of the processing of determining the presence/absence of the wobble signal by the system controller 10.

In the first embodiment, the first filter circuit 36 is constructed of a first band-pass filter 36*a*, whereas the second filter circuit 37 is constructed of a second band-pass filter 37*a*.

Figure 3A:
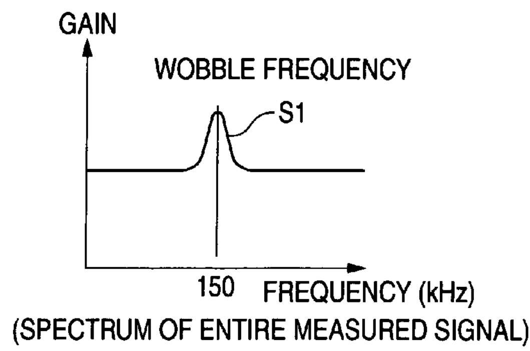
FIG. 3 is a spectrum diagram of a measured signal in a first embodiment of the wobble signal detecting circuit.
Figure 3B:
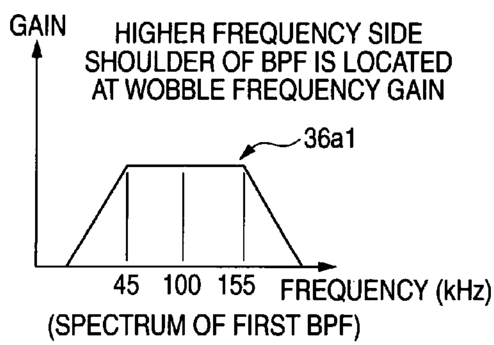
Figure 3C:
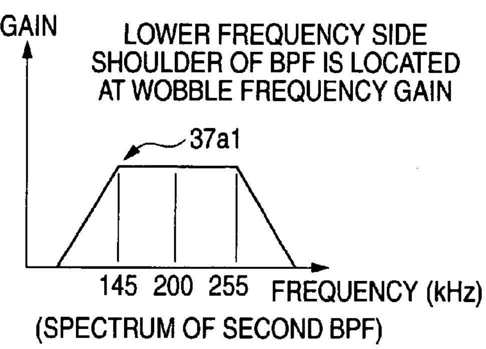

In this first embodiment, as shown in FIG. 3B, the first band-pass filter 36*a* has a bandwidth so that its higher frequency side shoulder (indicated by reference numeral 36*a*1) is located on the wobble frequency (e.g. 150 kHz). As shown in FIG. 3C, the second band-pass filter 37*a* has a bandwidth set so that its lower frequency side shoulder (indicated by reference numeral 37*a*1) is located on the wobble frequency (150 kHz).

Figure 3D:
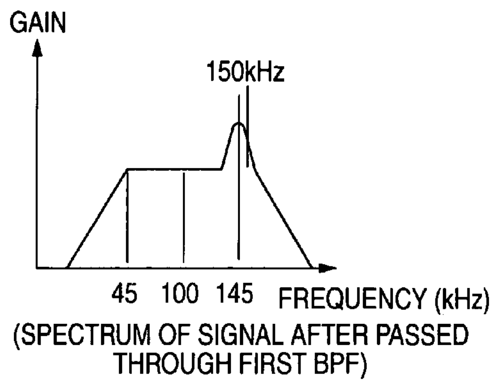
Figure 3E:
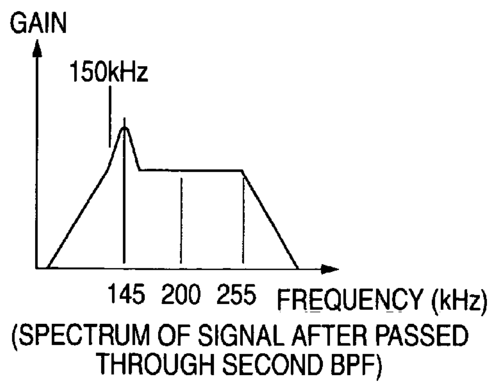

In accordance with the above configuration, with respect to the frequency (150 kHz) of the wobble signal, where the first band-pass filter 36*a* has the center frequency of 100 kHz and the pass bandwidth of 110 kHz, and the second band-pass filter 37*a* has the center frequency of 200 kHz and the pass bandwidth of 110 kHz, if the measured signal includes the wobble signal S1 as shown in FIG. 3A, through whichever band-pass filter, the frequency (frequency of about 150 kHz) in the vicinity of the wobble frequency will be measured. FIG. 3D is a signal spectrum diagram measured through the first band-pass filter 36*a*. As seen from FIG. 3D, the frequency (e.g. about 145 kHz) in the vicinity of the wobble frequency is measured. FIG. 3E is a signal spectrum diagram measured through the second band-pass filter 37*a*. As seen from FIG. 3E, the frequency (e.g. about 155 kHz) in the vicinity of the wobble frequency is measured. Namely, there is no substantial frequency difference measured after passed through both band-pass filters 36*a* and 37*a*. In this embodiment, the difference is about 10 kHz.

Figure 4A:
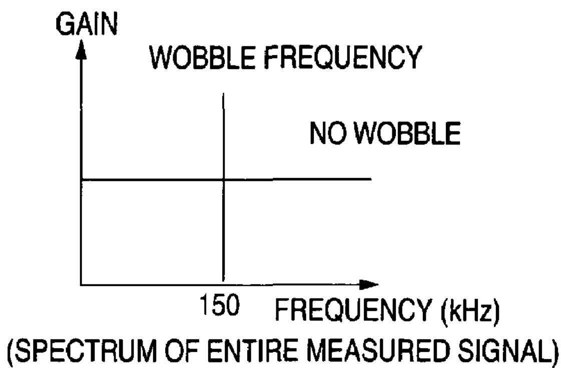
FIG. 4 is a spectrum diagram of a measured signal where a wobble signal is not present in the first embodiment of the wobble signal detecting circuit.
Figure 4B:
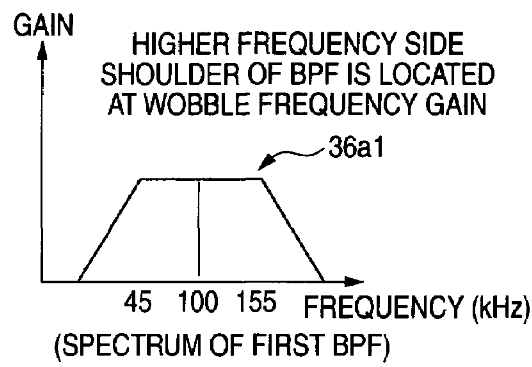
Figure 4C:
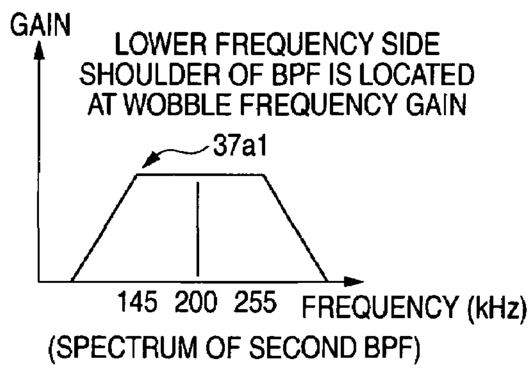
Figure 4D:
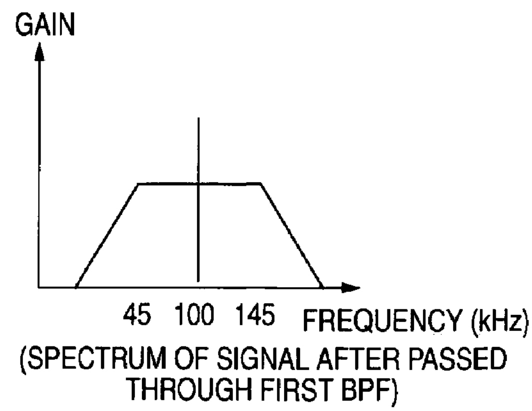
Figure 4E:
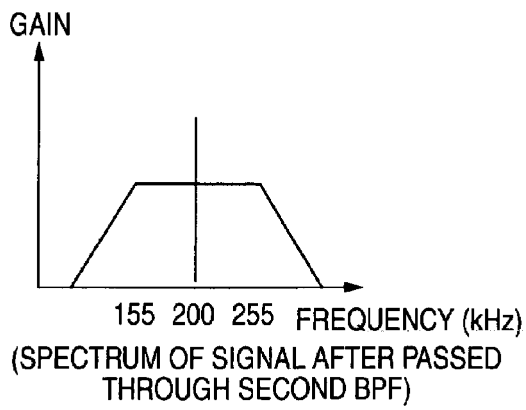

On the other hand, as shown in FIG. 4A, if the measured signal includes no wobble signal, the frequencies in the vicinity of the center frequencies of both band-pass filters 36*a* and 37*a* are measured. Specifically, the frequency measured after passed through the first band-pass filter 36*a* having the pass bandwidth shown in FIG. 4B is about 100 kHz as shown in FIG. 4D. The frequency measured after passed through the second band-pass filter 37*a* having the pass bandwidth shown in FIG. 4C is about 200 kHz as shown in FIG. 4E.

Thus, by taking the frequency difference or frequency ratio between both band-pass filters, whether or not the wobble signal is present can be determined exactly.

Namely, if the wobble signal is present, on the basis of the frequency of 145 kHz measured after passed through the first band-pass filter 36*a* and frequency of 155 kHz measured after passed through the second band-pass filter 37*a*, the frequency difference is 10 kHz and the frequency ratio is about 1.07 (=155/145). On the other hand, if the wobble signal is not present, the frequency difference is 100 kHz and the frequency ratio is 2 (=200/100).

In this way, the system controller 10, if the threshold value is set at e.g. 30 kHz for the frequency difference and at e.g. 1.2 for the frequency ratio, can surely detect the presence or absence of the wobble signal. Namely, if the frequency difference is not larger than 30 kHz, it can be determined that the wobble signal is present. If the frequency ratio is not larger than 1.2 kHz, it can be determined that the wobble signal is present.

In the second embodiment, the first filter circuit 36 is constructed of a band-pass filter 36*b*, whereas the second filter circuit 37 is constructed of a high-pass filter 37*b*.

Figure 5A:
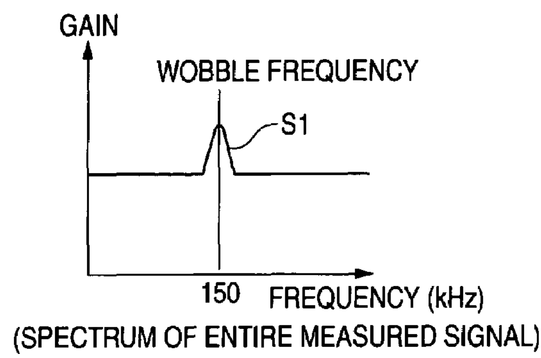
FIG. 5 is a spectrum diagram of a measured signal in a second embodiment of the wobble signal detecting circuit.
Figure 5B:
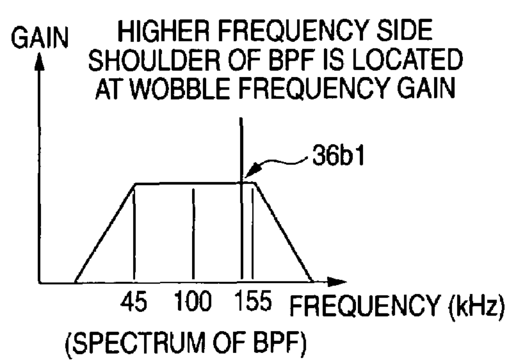
Figure 5C:
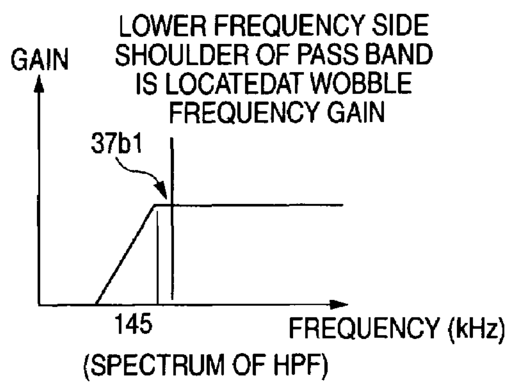

In this second embodiment, as shown in FIG. 5B, the band-pass filter 36*b* has a bandwidth set so that its higher frequency side shoulder (indicated by reference numeral 36*b*1) is located on the wobble frequency (150 kHz). As shown in FIG. 5C, the high-pass filter 37*b* has a pass band so that its lower frequency side shoulder (indicated by reference numeral 37*b*1) is located on the wobble frequency (e.g. 150 kHz). In the band-pass filter 36*b*, the center frequency is set at 100 kHz and the pass bandwidth is set at 110 kHz.

Figure 5D:
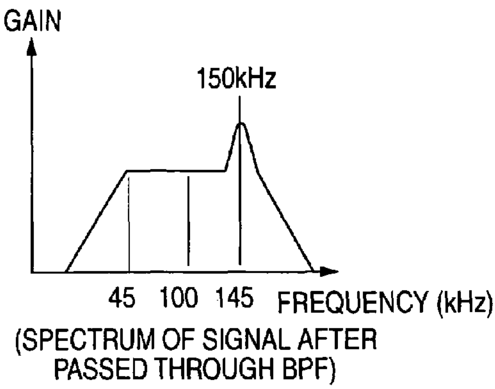
Figure 5E:
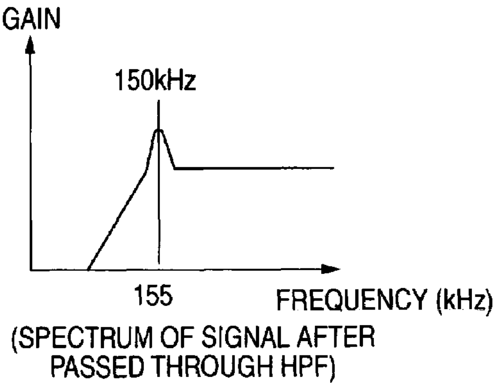

In accordance with the above configuration, if the measured signal includes the wobble signal S1 as shown in FIG. 5A, through whichever filter of the band-pass filter 36*b* and high-pass filter 37*a*, the frequency (frequency of about 150 kHz) in the vicinity of the wobble frequency will be measured. FIG. 5D is a signal spectrum diagram measured through the band-pass filter 36*a*. As seen from FIG. 5D, the frequency (e.g. about 145 kHz) in the vicinity of the wobble frequency is measured. FIG. 5E is a signal spectrum diagram measured through the high-pass filter 37*a*. As seen from FIG. 5E, the frequency (e.g. about 155 kHz) in the vicinity of the wobble frequency is measured. Namely, there is no substantial frequency difference measured after passed through both band-pass filters 36*b* and 37*a*. In this embodiment, the difference is about 10 kHz.

On the other hand, if the measured signal includes no wobble signal, in the band-pass filter 36*b*, the frequency in the vicinity of the center frequency thereof is measured, and in the high-pass filter 37*b*, the frequency at any position in the pass band is measured. Specifically, the frequency measured after passed through the band-pass filter 36*b* is about 100 kHz. The frequency measured after passed through the high-pass filter 37*b* is at least higher than the wobble frequency.

Thus, by taking the frequency difference or frequency ratio between both filters, whether or not the wobble signal is present can be determined exactly.

Namely, if the wobble signal is present, on the basis of the frequency of 145 kHz measured after passed through the band-pass filter 36*b* and frequency of 155 kHz measured after passed through the high-pass filter 37*b*, the frequency difference is 10 kHz and the frequency ratio is about 1.07 (=155/145). On the other hand, if the wobble signal is not present, the frequency difference is at least 50 kHz or more and the frequency ratio is at least 1.5 (=150/100) or more.

In this way, the system controller 10, if the threshold value is set at e.g. 30 kHz for the frequency difference and at e.g. 1.2 for the frequency ratio, can surely detect the presence or absence of the wobble signal. Namely, if the frequency difference is not larger than 30 kHz, it can be determined that the wobble signal is present. If the frequency ratio is not larger than 1.2 kHz, it can be determined that the wobble signal is present.

In the third embodiment, the first filter circuit 36 is constructed of a low-pass filter 36*c*, whereas the second filter circuit 37 is constructed of a band-pass filter 37*c*.

Figure 6A:
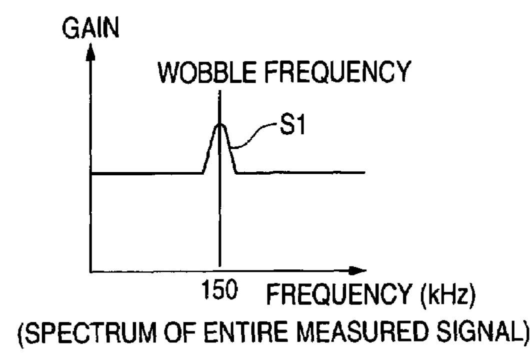
FIG. 6 is a spectrum diagram of a measured signal in a third embodiment of the wobble signal detecting circuit.
Figure 6B:
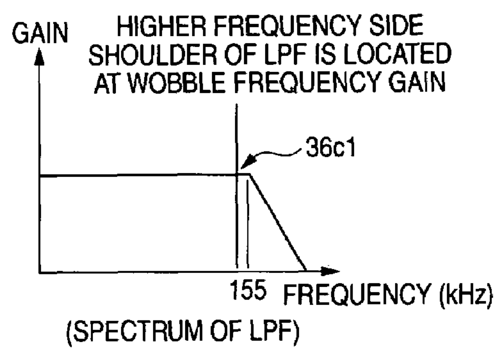
Figure 6C:
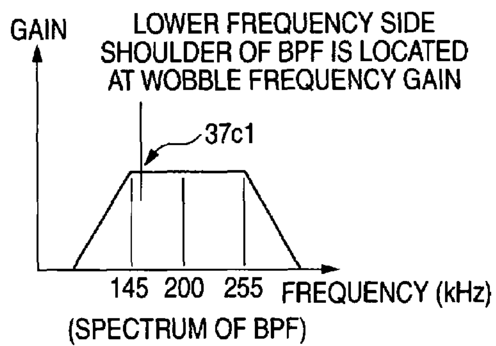

In this third embodiment, as shown in FIG. 6B, the low-pass filter 36*c* has a pass band set so that its higher frequency side shoulder (indicated by reference numeral 36*c*1) is located on the wobble frequency (150 kHz). As shown in FIG. 6C, the band-pass filter 37*c* has a bandwidth set so that its lower frequency side shoulder (indicated by reference numeral 37*c*1) is located on the wobble frequency (e.g. 150 kHz). In the band-pass filter 37*c*, the center frequency is set at 200 kHz and the pass bandwidth is set at 110 kHz.

Figure 6D:
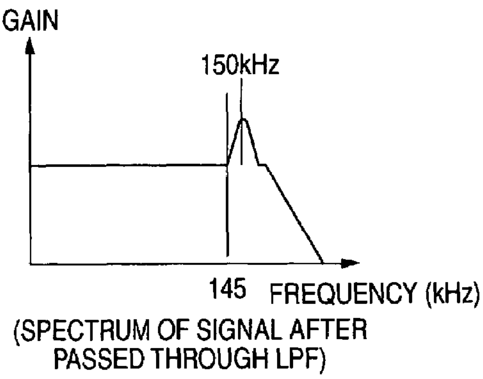
Figure 6E:
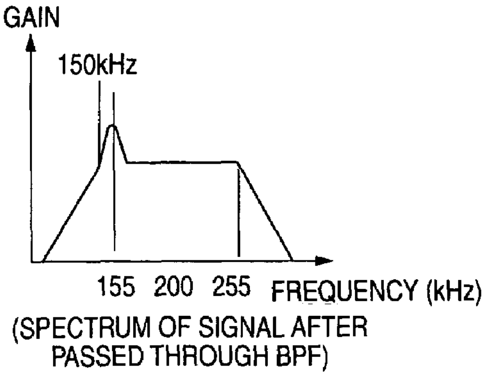

In accordance with the above configuration, if the measured signal includes the wobble signal S1 as shown in FIG. 6A, through whichever filter of the low-pass filter 36*c* and band-pass filter 37*c*, the frequency (frequency of about 150 kHz) in the vicinity of the wobble frequency will be measured. FIG. 6D is a signal spectrum diagram measured through the low-pass filter 36*c*. As seen from FIG. 6D, the frequency (e.g. about 145 kHz) in the vicinity of the wobble frequency is measured. FIG. 6E is a signal spectrum diagram measured through the band-pass filter 37*c*. As seen from FIG. 6E, the frequency (e.g. about 155 kHz) in the vicinity of the wobble frequency is measured. Namely, there is no substantial frequency difference measured after passed through both filters 36*c* and 37*c*. In this embodiment, the difference is about 10 kHz.

On the other hand, if the measured signal includes no wobble signal, in the low-pass filter 36*c*, the frequency at any position in the pass band is measured, and in the band-pass filter 37*c*, the frequency in the vicinity of the center frequency thereof is measured. Specifically, the frequency measured after passed through the band-pass filter 36*c* is about 200 kHz. The frequency measured after passed through the low-pass filter 36*c* is at least lower than the wobble frequency (150 kHz).

Thus, by taking the frequency difference or frequency ratio between both filters, whether or not the wobble signal is present can be determined exactly.

Namely, if the wobble signal is present, on the basis of the frequency of 145 kHz measured after passed through the low-pass filter 36*c* and frequency of 155 kHz of after passed through the band-pass filter 37*c*, the frequency difference is 10 kHz and the frequency ratio is about 1.07 (=155/145). On the other hand, if the wobble signal is not present, the frequency difference is at least 50 kHz or more and the frequency ratio is at least 1.5 (=150/100) or more.

In this way, the system controller 10, if the threshold value is set at e.g. 30 kHz for the frequency difference and at e.g. 1.2 for the frequency ratio, can surely detect the presence or absence of the wobble signal. Namely, if the frequency difference is not larger than 30 kHz, it can be determined that the wobble signal is present. If the frequency ratio is not larger than 1.2 kHz, it can be determined that the wobble signal present.

In the fourth embodiment, the first filter circuit 36 is constructed of a low-pass filter 36*d*, whereas the second filter circuit 37 is constructed of a high-pass filter 37*d*.

Figure 7A:
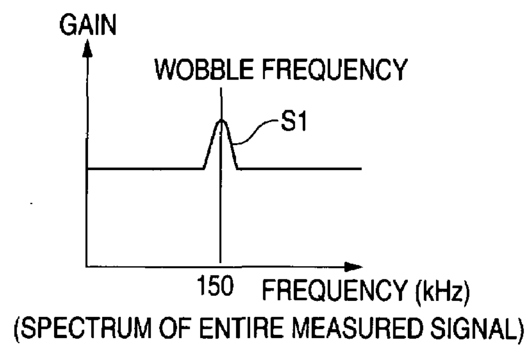
FIG. 7 is a spectrum diagram of a measured signal in a fourth embodiment of the wobble signal detecting circuit.
Figure 7B:
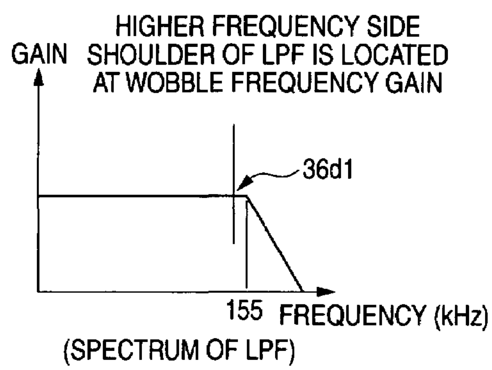
Figure 7C:
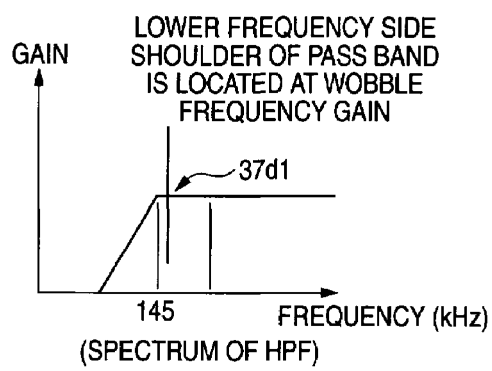

In this third embodiment, as shown in FIG. 7B, the low-pass filter 36*d* has a pass band set so that its higher frequency side shoulder (indicated by reference numeral 36*d*1) is located on the wobble frequency (150 kHz). As shown in FIG. 7C, the high-pass filter 37*d* has a pass band set so that its lower frequency side shoulder (indicated by reference numeral 37*d*1) is located on the wobble frequency (e.g. 150 kHz).

Figure 7D:
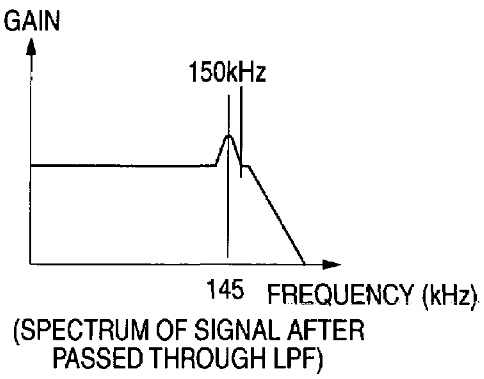
Figure 7E:
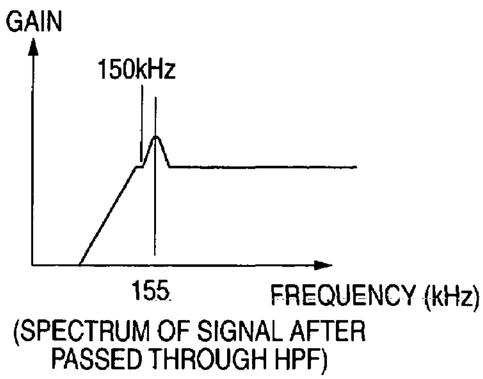
Figure 8:
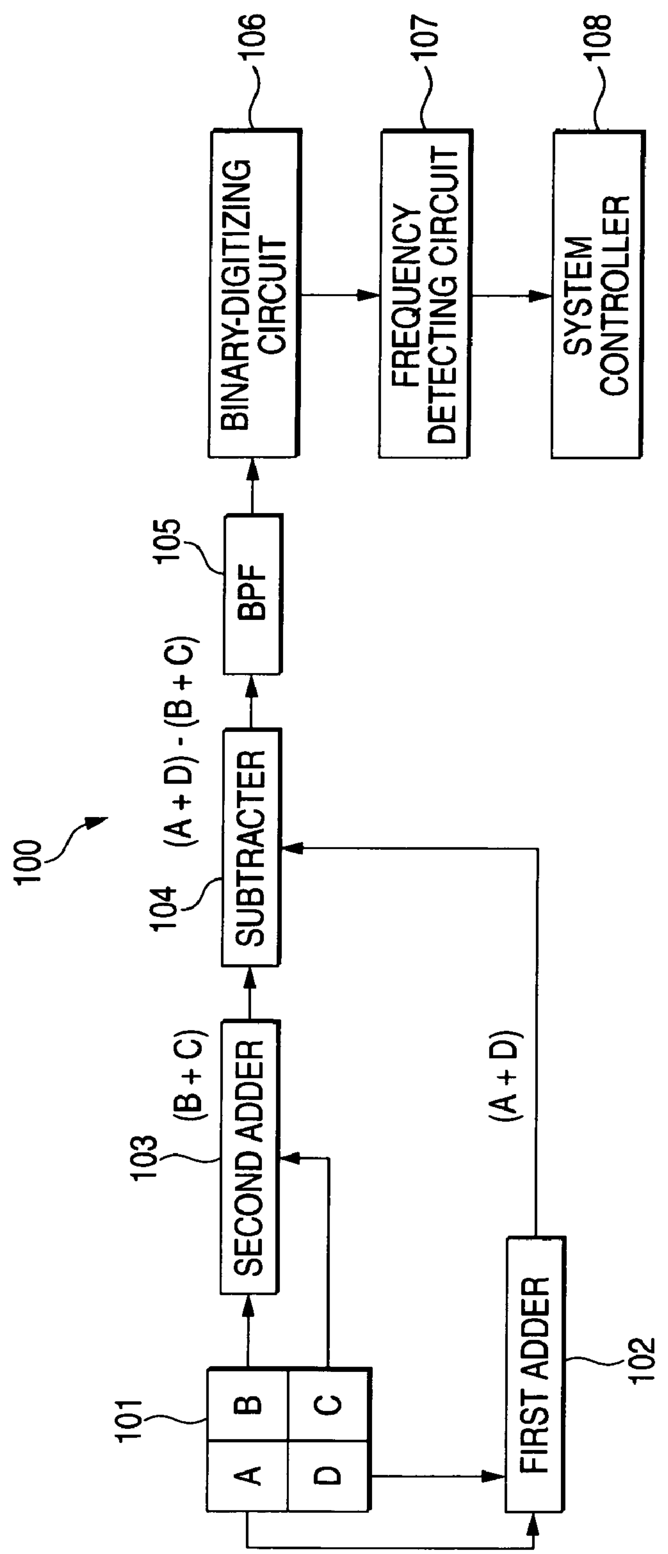
FIG. 8 is a block diagram showing a general exemplary configuration of a conventional wobble detecting circuit.
Figure 9A:
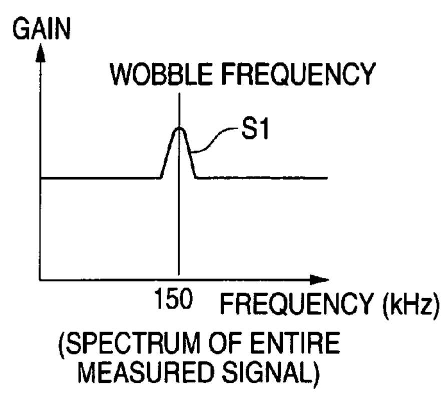
FIG. 9 is a spectrum diagram of a measured signal where a wobble signal is present in a conventional wobble signal detecting circuit.
Figure 9B:
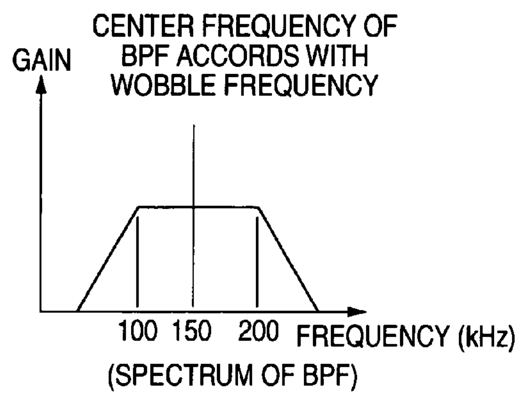
Figure 9C:
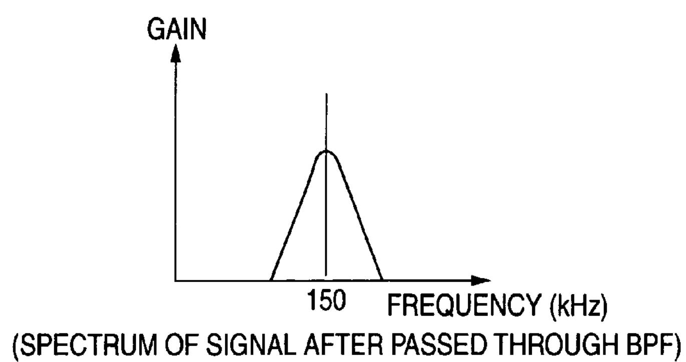
Figure 10A:
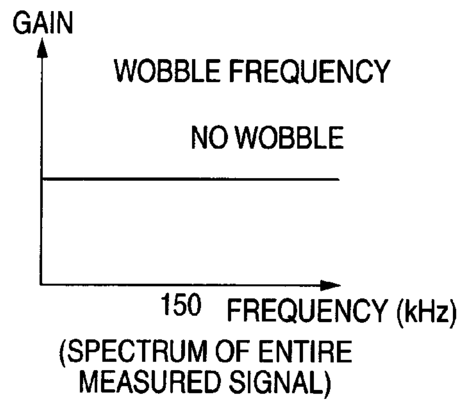
FIG. 10 is a spectrum diagram of a measured signal where the wobble signal is not present in a conventional wobble signal detecting circuit.
Figure 10B:
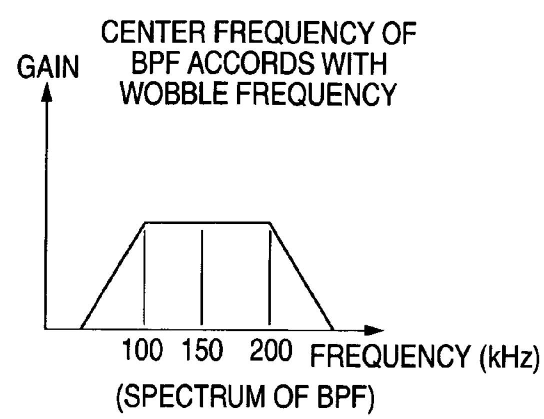
Figure 10C:
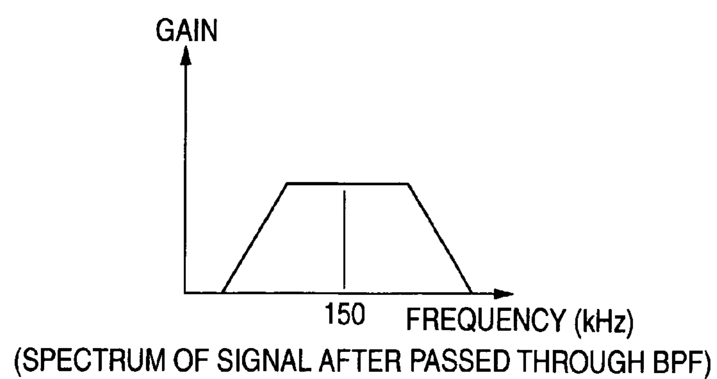

In accordance with the above configuration, if the measured signal includes the wobble signal S1 as shown in FIG. 7A, through which ever filter of the low-pass filter 36*d* and high-pass filter 37*d*, the frequency (frequency of about 150 kHz) in the vicinity of the wobble frequency will be measured. FIG. 7D is a signal spectrum diagram measured through the low-pass filter 36*d*. As seen from FIG. 7D, the frequency (e.g. about 145 kHz) in the vicinity of the wobble frequency is measured. FIG. 7E is a signal spectrum diagram measured through the high-pass filter 37*d*. As seen from FIG. 7E, the frequency (e.g. about 155 kHz) in the vicinity of the wobble frequency is measured. Namely, there is no substantial frequency difference measured after passed through both filters 36*d* and 37*d*. In this embodiment, the difference is about 10 kHz.

On the other hand, if the measured signal includes no wobble signal, in both the low-pass filter 36*d* and high-pass filter 37*d*, the frequency at any position in the pass band is measured. In this case, the measured frequency is affected by the noise component. Therefore, there is a larger frequency difference than the above 10 kHz between the frequencies measured after passed through the high-pass filter 36*d* and the low-pass filter 37*d*.

Thus, by taking the frequency difference or frequency ratio between both filters, whether or not the wobble signal is present can be determined exactly.

Namely, if the wobble signal is present, on the basis of the frequency of 145 kHz measured after passed through the low-pass filter 36*d* and frequency of 155 kHz measured after passed through the high-pass filter 37*d*, the frequency difference is 10 kHz and the frequency ratio is about 1.07 (=155/145). On the other hand, if the wobble signal is not present, the frequency difference is e.g. 50 kHz or more and the frequency ratio is e.g. 1.5 (=150/100) or more.

In this way, the system controller 10, if the threshold value is set at e.g. 30 kHz for the frequency difference and at e.g. 1.2 for the frequency ratio, can surely detect the presence or absence of the wobble signal. Namely, if the frequency difference is not larger than 30 kHz, it can be determined that the wobble signal is present. If the frequency ratio is not larger than 1.2 kHz, it can be determined that the wobble signal is present. The threshold values for the frequency difference and for the frequency ratio are dependent on the reproduction speed, and are not limited to the above values, since the system controller provided in the present invention may be applied to not only a normal reproduction speed apparatus but also a double- or quad-speed reproduction speed apparatus.

What is claimed is:

1. A wobble signal detecting circuit for an optical disk reproducing device configured to reproduce an optical disk which has a track including a snaking portion at a specific period, the wobble signal detecting circuit comprising:

an optical detecting unit which detects a signal written on the track;

a first band-pass filter and a second band-pass filter, which have different pass bandwidths, and extract a first wobble frequency component of the snaking portion and a second wobble frequency component of the snaking portion, respectively, based on outputs from the optical detecting unit; and a wobble signal determining unit which compares the first wobble frequency component and the second wobble frequency component, to determine whether or not a wobble signal is present, wherein the wobble signal determining unit determines that a wobble signal is present if a frequency difference or a frequency ratio of the first wobble frequency component and the second wobble frequency component is equal to or less than a prescribed value, the first band-pass filter has a bandwidth, upper cutoff of frequency part of the bandwidth of which is located on a wobble frequency, the second band-pass filter has a bandwidth, lower cutoff of frequency part of bandwidth of which is located on the wobble frequency, and a part of the pass bandwidth of the first band-pass filter is overlapped with a part of the pass bandwidth of the second band-pass filter.

2. A wobble signal detecting circuit for an optical disk reproducing device configured to reproduce an optical disk which has a track including a snaking portion at a specific period, the wobble signal detecting circuit comprising:

an optical detecting unit which detects a signal written on the track;

two kinds of filter circuits, which have different pass bandwidths, and extracting wobble frequency components of the snaking portion based on outputs from the optical detecting unit, wherein a part of the pass bandwidths are overlapped with each other; and a wobble signal determining unit which compares the wobble frequency components, to determine whether or not a wobble signal is present.

3. The wobble signal detecting circuit for an optical disk reproducing device according to claim 2, wherein the wobble signal determining unit determines that a wobble signal is present if a frequency difference or a frequency ratio of the wobble frequency components is equal to or less than a prescribed value.

4. The wobble signal detecting circuit for an optical disk reproducing device according to claim 2, wherein the two kinds of filter circuits are a first band-pass filter and a second band-pass filter, the first band-pass filter has a bandwidth, a higher frequency side shoulder of which is located on a wobble frequency, and the second band-pass filter has a bandwidth, a lower frequency side shoulder of which is located on the wobble frequency.

5. The wobble signal detecting circuit for an optical disk reproducing device according to claim 2, wherein the two kinds of filter circuits are a high-pass filter and a band-pass filter, the high-pass filter has a pass band, a lower frequency side shoulder of which is located on a wobble frequency, and the band-pass filter has a bandwidth, a higher frequency side shoulder of which is located on the wobble frequency.

6. The wobble signal detecting circuit for an optical disk reproducing device according to claim 3, wherein the two kinds of filter circuits are a high-pass filter and a band-pass filter, the high-pass filter has a pass band, a lower frequency side shoulder of which is located on a wobble frequency, and the band-pass filter has a bandwidth, a higher frequency side shoulder of which is located on the wobble frequency.

7. The wobble signal detecting circuit for an optical disk reproducing device according to claim 2, wherein the two kinds of filter circuits are a low-pass filter and a band-pass filter, the low-pass filter has a pass band, a higher frequency side shoulder of which is located on a wobble frequency, and the band-pass filter has a bandwidth, a lower frequency side shoulder of which is located on the wobble frequency.

8. The wobble signal detecting circuit for an optical disk reproducing device according to claim 3, wherein the two kinds of filter circuits are a low-pass filter and a band-pass filter, the low-pass filter has a pass band, a higher frequency side shoulder of which is located on a wobble frequency, and the band-pass filter has a bandwidth, a lower frequency side shoulder of which is located on the wobble frequency.

9. The wobble signal detecting circuit for an optical disk reproducing device according to claim 2, wherein the two kinds of filter circuits are a high-pass filter and a low-pass filter, and the high-pass filter has a pass band, a lower frequency side shoulder of which is located on a wobble frequency, and the low-pass filter has a pass band, a higher frequency side shoulder of which is located on the wobble frequency.

10. The wobble signal detecting circuit for an optical disk reproducing device according to claim 3, wherein the two kinds of filter circuits are a high-pass filter and a low-pass filter, and the high-pass filter has a pass band, a lower frequency side shoulder of which is located on a wobble frequency, and the low-pass filter has a pass band, a higher frequency side shoulder of which is located on the wobble frequency.

11. A wobble signal detecting method configured to detect a wobble signal in an optical disk which has a track including a snaking portion at a specific period, the wobble signal detecting method comprising:

detecting a signal written on the track;

extracting two kinds of wobble frequency components of the snaking portion based on a detected signal by two kinds of filter circuits, which have different pass bandwidths a part of which are overlapped with each other; and determining that a wobble signal is present if a frequency difference or a frequency ratio of the two kinds of wobble frequency components is equal to or less than a prescribed value.

* * * * *